United States Patent
Murakami et al.

(10) Patent No.: US 10,704,576 B2
(45) Date of Patent: Jul. 7, 2020

(54) MODULE ATTACHMENT DEVICE

(71) Applicant: Panasonic Intellectual Property Management Co., Ltd., Osaka (JP)

(72) Inventors: Hiroyuki Murakami, Osaka (JP); Keiichi Taketani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/828,970

(22) Filed: Dec. 1, 2017

(65) Prior Publication Data

US 2018/0231034 A1    Aug. 16, 2018

Related U.S. Application Data

(63) Continuation of application No. PCT/JP2017/004850, filed on Feb. 10, 2017.

(51) Int. Cl.
| | |
|---|---|
| *F16M 13/00* | (2006.01) |
| *F16B 2/04* | (2006.01) |
| *B64D 11/00* | (2006.01) |
| *B64D 11/06* | (2006.01) |

(52) U.S. Cl.
CPC .......... *F16B 2/04* (2013.01); *B64D 11/00155* (2014.12); *B64D 11/0646* (2014.12)

(58) Field of Classification Search
CPC .............................. F16M 11/041; F16M 13/00
USPC ........ 248/316.1, 316.3, 316.4, 316.6, 346.04
See application file for complete search history.

(56) References Cited

U.S. PATENT DOCUMENTS

| | | | |
|---|---|---|---|
| 4,564,308 A | 1/1986 | Ikegami et al. | |
| 4,957,449 A | 9/1990 | Hatagishi | |
| 6,585,212 B2 * | 7/2003 | Carnevali | B60R 11/02 248/316.4 |
| 8,282,063 B2 * | 10/2012 | Ou | B60R 11/0241 248/316.3 |
| 10,118,565 B2 * | 11/2018 | Kim | B60R 11/02 |
| 2008/0213656 A1 | 9/2008 | Yamasaki et al. | |

(Continued)

FOREIGN PATENT DOCUMENTS

| | | |
|---|---|---|
| JP | 63-237007 | 10/1988 |
| JP | 1-41291 | 12/1989 |

(Continued)

OTHER PUBLICATIONS

International Search Report dated May 9, 2017 in International Application No. PCT/JP2017/004850.

*Primary Examiner* — Steven M Marsh
(74) *Attorney, Agent, or Firm* — Wenderoth, Lind & Ponack, L.L.P.

(57) ABSTRACT

A module attachment device includes: a first module that includes a first casing and a first moving member, the first moving member being configured such that when a first end is pushed, a second end protrudes from the first casing; and a second module that is engaged with a mounting surface, and includes a second moving member that is disposed at a position where the second moving member is capable of pushing the first end of the first moving member, wherein in response to the first end of the first moving member being pushed by the second moving member, the second end of the first moving member protruding from the first casing comes into engagement with the mounting surface.

8 Claims, 17 Drawing Sheets

(56) References Cited

U.S. PATENT DOCUMENTS

| | | | | |
|---|---|---|---|---|
| 2012/0273642 A1* | 11/2012 | Zhang | ................ | H05K 5/0234 |
| | | | | 248/346.04 |
| 2013/0105657 A1* | 5/2013 | Huang | ................ | H02J 7/0042 |
| | | | | 248/346.04 |
| 2013/0206945 A1* | 8/2013 | Chen | ................ | F16M 11/041 |
| | | | | 248/316.4 |
| 2017/0136960 A1* | 5/2017 | Kim | ................ | B60R 11/0241 |

FOREIGN PATENT DOCUMENTS

| | | |
|---|---|---|
| JP | 11-283141 | 10/1999 |
| JP | 2006-221989 | 8/2006 |

* cited by examiner

MODULE ATTACHMENT DEVICE

CROSS REFERENCE TO RELATED APPLICATION

This application is a U.S. continuation application of PCT International Patent Application Number PCT/JP2017/004850 filed on Feb. 10, 2017, the entire content of which is hereby incorporated by reference.

BACKGROUND

1. Technical Field

The present disclosure relates to a module attachment device.

2. Description of the Related Art

Japanese Unexamined Patent Application Publication No. H11-283141 discloses metal attachment hardware that attaches an embedded smoke detector base to a mounting surface such as a ceiling without a screwing operation.

However, the metal attachment hardware disclosed in Japanese Unexamined Patent Application Publication No. H11-283141 is configured such that the surface to be embedded in the ceiling has a protruding configuration, which requires a large space enough to accommodate the metal attachment hardware on the back side of the mounting surface. Also, the use of a tool such as a driver is required to move the metal attachment hardware to the fastening position. Accordingly, this technique eliminates the need for a screwing operation, but without a tool, it is not possible to attach an appliance to the mounting surface.

SUMMARY

One aspect of the present disclosure provides a module coupling/attachment device that has a compact configuration and facilitates an attachment operation for attachment to a mounting surface.

A module attachment device according to one aspect of the present disclosure includes: a first module that includes a first casing and a first moving member, the first moving member being configured such that when a first end is pushed, a second end protrudes from the first casing; and a second module that is engaged with a mounting surface, and includes a second moving member that is disposed at a position where the second moving member is capable of pushing the first end of the first moving member, wherein in response to the first end of the first moving member being pushed by the second moving member, the second end of the first moving member protruding from the first casing comes into engagement with the mounting surface.

The module attachment device according to one aspect of the present disclosure has a compact configuration and facilitates an attachment operation for attachment to a mounting surface.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, embodiments will be described in detail with reference to the drawings as appropriate. However, an excessively detailed description may be omitted. For example, a detailed description of already well-known matters and an overlapping description of substantially the same structural elements may be omitted. This is to avoid the following description from being unnecessarily lengthy and to facilitate the understanding of a person having ordinary skill in the art.

The accompanying drawings and the following description are provided for a person having ordinary skill in the art to sufficiently understand the present disclosure, and thus the accompanying drawings and the following description are not intended to limit the subject matter of the claims.

Embodiment 1

A description will be given of passenger operation device 100 according to Embodiment 1 of the present disclosure with reference to FIGS. 1 to 12.

[1-1. Overall Configuration]

Figure 1:
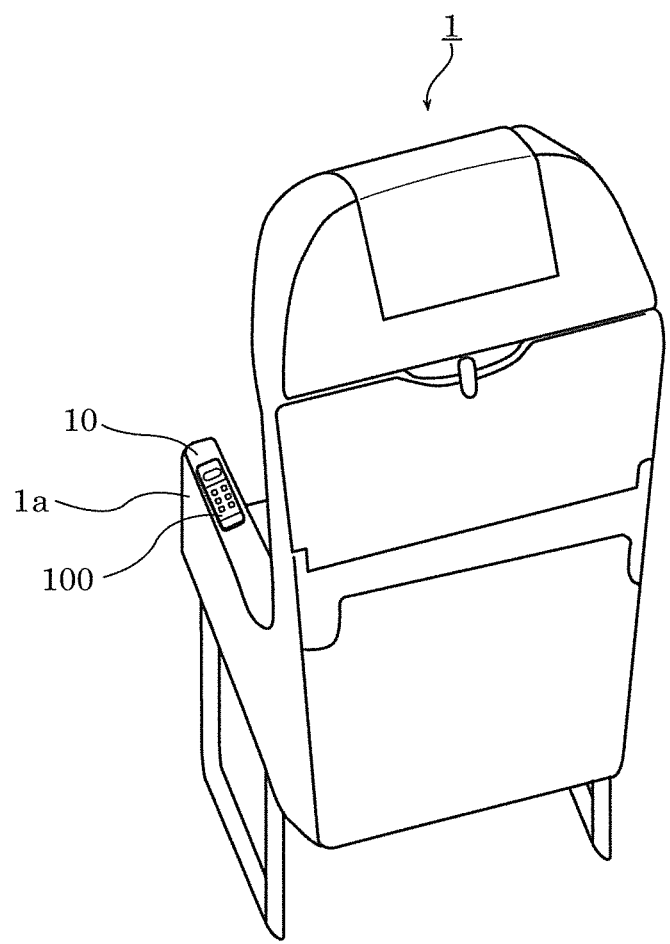
FIG. 1 is a perspective view showing an example of a seat installed in a passenger cabin of an aircraft.

FIG. 1 is a perspective view showing an example of a seat installed in a passenger cabin of an aircraft.

Passenger operation device 100 is provided embedded in mounting surface 10a of plate-like member 10 that constitutes an upper portion of arm rest 1a of seat 1 that is one of a plurality of seats installed in a passenger cabin of an aircraft. That is, mounting surface 10a is an upper surface of arm rest 1a of seat 1. Passenger operation device 100 is an example of a module attachment device. A passenger seated in seat 1 can use an entertainment system installed in the passenger cabin of the aircraft or call a cabin attendant by operating passenger operation device 100 installed in arm rest 1a.

Figure 2:
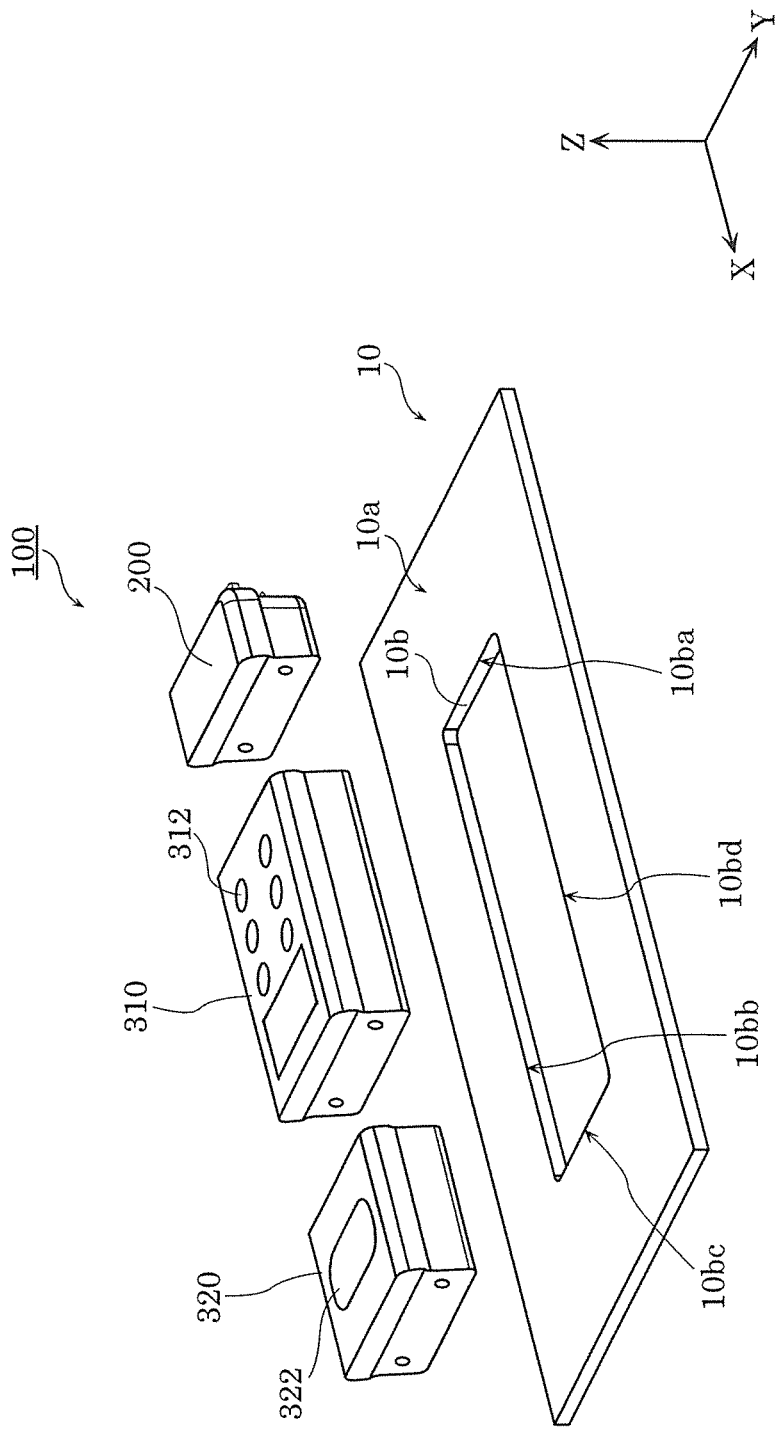
FIG. 2 is an exploded perspective view of a passenger operation device.

FIG. 2 is an exploded perspective view of passenger operation device 100.

As shown in FIG. 2, passenger operation device 100 includes coupling module 200, operation button module 310, and connector module 320. Coupling module 200, operation button module 310, and connector module 320 are aligned in a predetermined direction (X-axis direction). In the present embodiment, the predetermined direction refers to, for example, the direction of extension of arm rest 1a of seat 1, or in other words, the front and back direction of seat 1. Coupling module 200 is an example of a second module, and operation button module 310 and connector module 320 constitute an example of a first module.

Operation button module 310 includes a plurality of operation buttons 312. The plurality of operation buttons 312 are input devices that are used to make various settings in the entertainment system, select content, call a cabin attendant, and the like.

Connector module 320 includes connector 322. Connector 322 is used to connect to other entertainment systems, perform charging, and the like. Connector 322 is, for example, an USB (Universal Serial Bus) interface.

Operation button module 310 and connector module 320 are different in configuration in that operation button module 310 includes a plurality of operation buttons 312, and connector module 320 includes connector 322, and they also have different outer contour lengths (to be specific, the length in X-axis direction). However, operation button module 310 and connector module 320 have the same attachment structure for attachment to mounting surface 10a. Also, the positions of operation button module 310 and connector module 320 are replaceable.

Coupling module 200, operation button module 310, and connector module 320 that constitute passenger operation device 100 are not coupled to each other before attachment to mounting surface 10a. Passenger operation device 100 is disposed by, first, disposing coupling module 200 in opening portion 10b formed in mounting surface 10a, and then disposing operation button module 310 and connector module 320 in opening portion 10b.

In the present embodiment, the direction extending from coupling module 200 toward connector module 320 will be referred to as plus X-axis direction. Likewise, the direction vertical to mounting surface 10a (in other words, the up and down direction of seat 1) will be referred to as Z-axis direction. The direction extending from the inside toward the outside of arm rest 1a (upward direction) with respect to mounting surface 10a will be referred to as plus Z-axis direction, and the opposite direction (downward direction) will be referred to as minus Z-axis direction. Y-axis direction is defined by applying X-axis direction and Z-axis direction defined as described above to a right-handed coordinate system. That is, the direction (in other words, the right and left direction of seat 1) that is vertical to X-axis direction and Z-axis direction will be referred to as Y-axis direction. The direction extending toward the left side will be referred to as plus Y-axis direction, and the direction toward the right side will be referred to as minus Y-axis direction. In short, in the diagrams, the tip ends of arrows indicating X-axis direction, Y-axis direction, and Z-axis direction indicate the plus direction, and the opposite ends indicate the minus direction.

As shown in FIG. 2, mounting surface 10a is the upper surface of plate-like member 10 that constitutes the upper portion of arm rest 1a, and opening portion 10b extends through plate-like member 10 in the thickness direction, and has a rectangular shape as viewed from Z-axis direction. Opening portion 10b includes edges 10ba, 10bb, 10bc, and 10bd that constitute four sides of the rectangular shape. Edge 10ba constitutes one of the sides of opening portion 10b that is on minus X-axis direction side, and comes into contact with a portion of coupling module 200 that is on minus X-axis direction side. Edge 10bc constitutes one of the sides of opening portion 10b that is on plus X-axis direction side, and opposes edge 10ba in X-axis direction. Edge 10bb constitutes one of the sides of opening portion 10b that is on minus Y-axis direction side, and connects the end portion of edge 10ba and the end portion of edge 10bc that are on minus Y-axis direction side. Edge 10bd constitutes one of the sides of opening portion 10b that is on plus Y-axis direction side, opposes edge 10bb in Y-axis direction, and connects the end portion of edge 10ba and the end portion of edge 10bc that are on plus Y-axis direction side.

Figure 3:
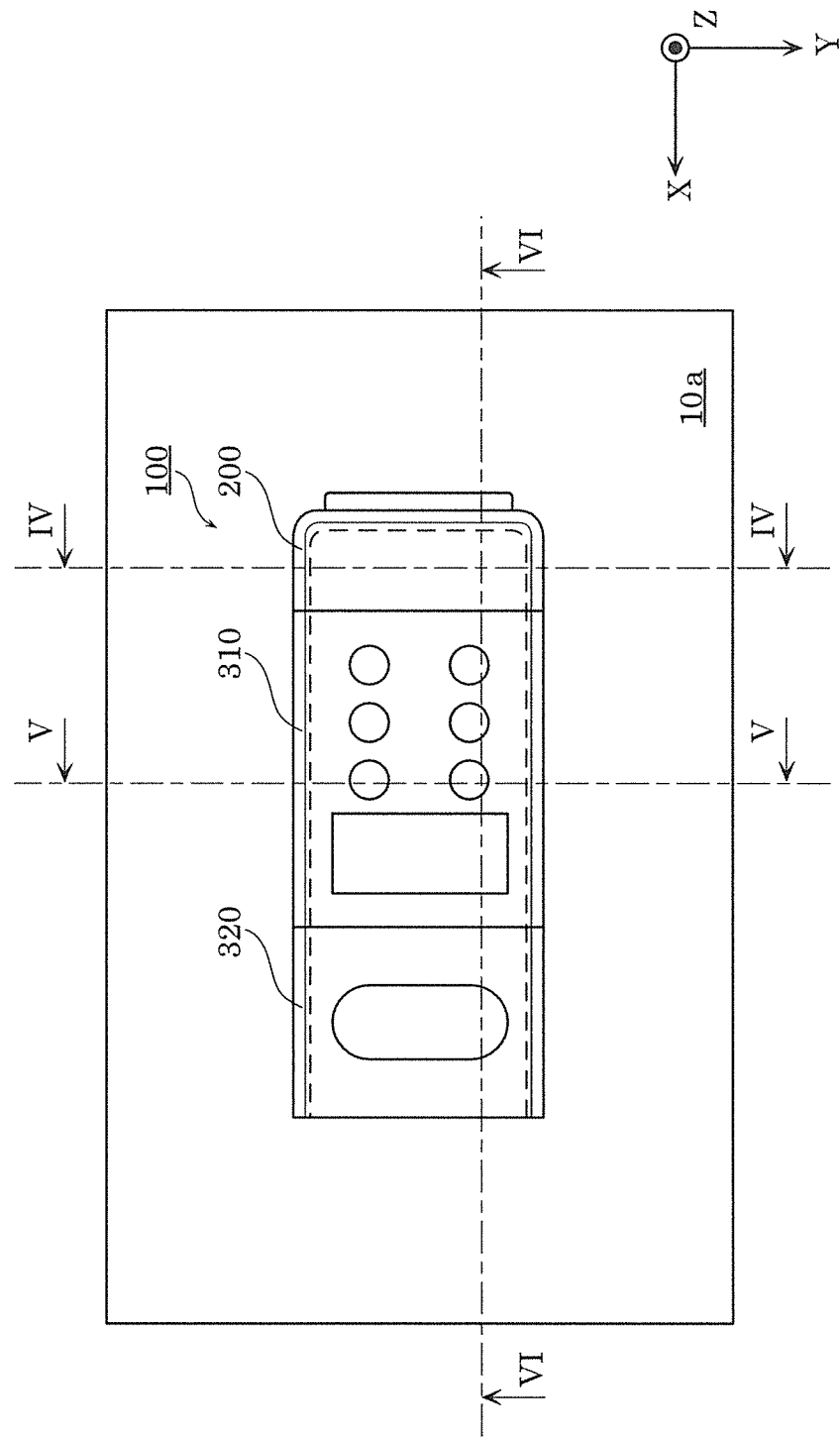
FIG. 3 is a plan view of the passenger operation device installed in a mounting surface as viewed from plus Z-axis direction.
Figure 4:
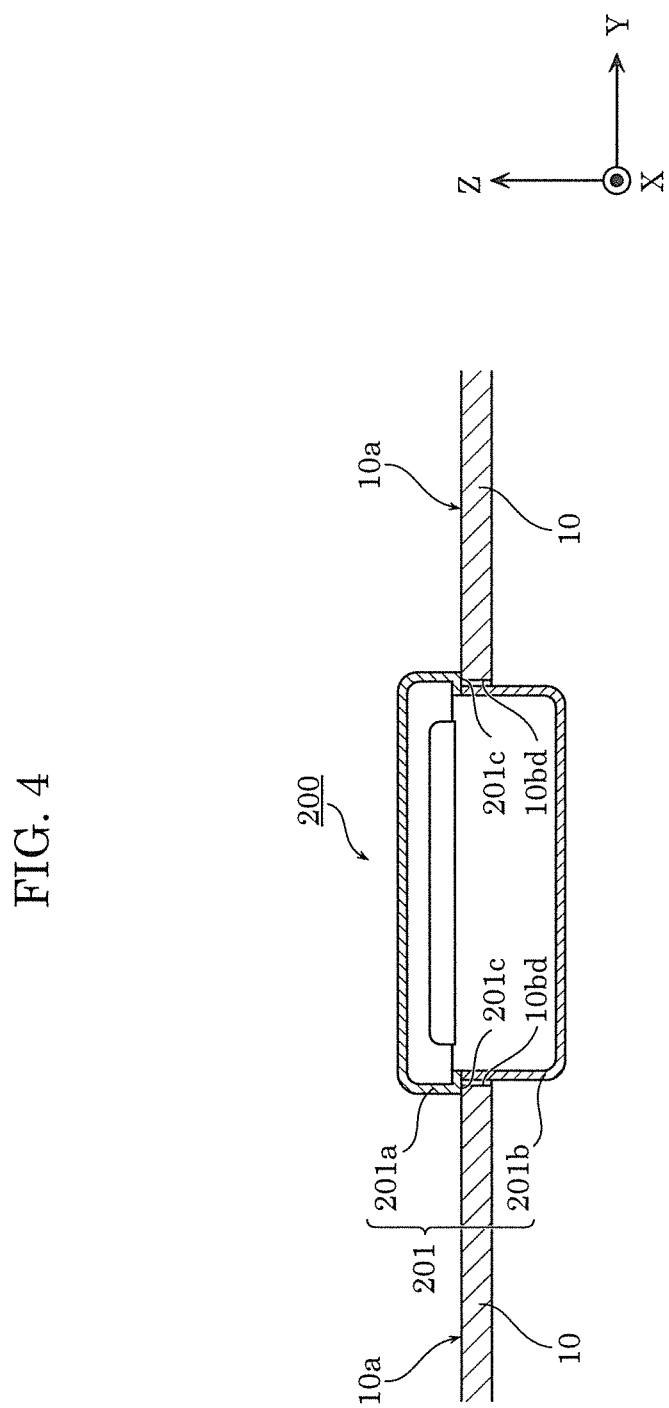
FIG. 4 is a diagram showing a IV-IV cross section taken along a plane parallel to YZ plane in FIG. 3.
Figure 5:
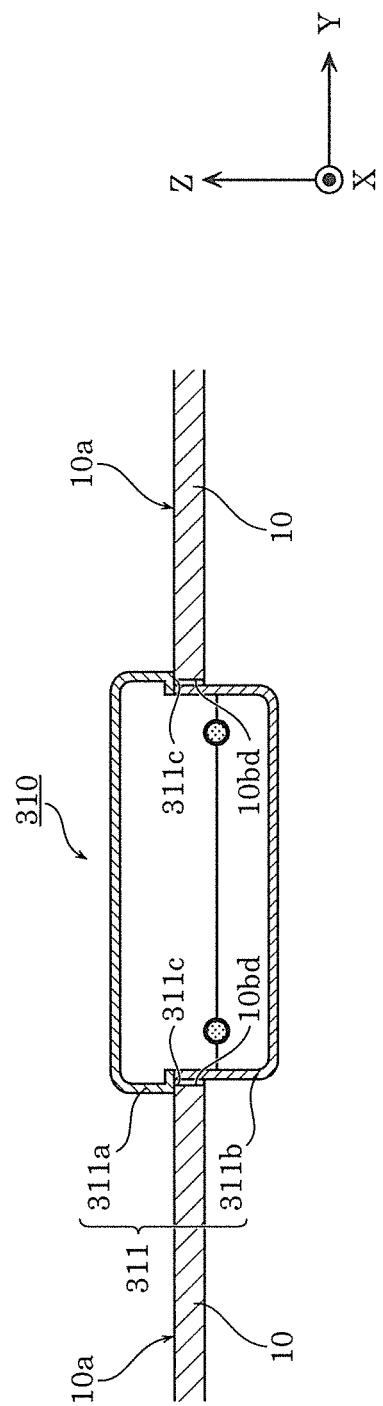
FIG. 5 is a diagram showing a V-V cross section taken along a plane parallel to YZ plane in FIG. 3.

FIG. 3 is a plan view of passenger operation device 100 installed in mounting surface 10a as viewed from plus Z-axis direction. FIG. 4 is a diagram showing a IV-IV cross section taken along a plane parallel to YZ plane in FIG. 3. FIG. 5 is a diagram showing a V-V cross section taken along a plane parallel to YZ plane in FIG. 3.

As shown in FIG. 4, coupling module 200 includes casing 201. Casing 201 is configured such that, when viewed from Z-axis direction, upper portion 201a that is on plus Z-axis direction side extends outward in Y-axis direction beyond lower portion 201b that is on minus Z-axis direction side. Upper portion 201a has a width in Y-axis direction that is larger than the width in Y-axis direction of opening portion 10b, and lower portion 201b has a width in Y-axis direction that is smaller than the width in Y-axis direction of opening portion 10b. That is, casing 201 has installation surface 201c that is formed as a result of upper portion 201a extending in Y-axis direction beyond lower portion 201b on both sides of upper portion 201a. Installation surface 201c is a surface (lower surface) of an extension portion of upper portion 201a extending in Y-axis direction beyond lower portion 201b on both sides of upper portion 201a, the surface being on minus Z-axis direction side.

With this configuration, casing 201 is disposed with installation surface 201c being in contact with a periphery of opening portion 10b of mounting surface 10a. Accordingly, the position of casing 201 in Z-axis direction is uniquely determined, and casing 201 will not sink into arm rest 1a. That is, with installation surface 201c, casing 201 is restricted to move in minus Z-axis direction due to mounting surface 10a.

Also, casing 201 is configured such that the width in Y-axis direction of lower portion 201b is smaller than the width in Y-axis direction of opening portion 10b by an amount corresponding to a predetermined clearance. Accordingly, the position of casing 201 in Y-axis direction is restricted by edge 10bb and edge 10bd of opening portion 10b that oppose in Y-axis direction.

As shown in FIG. 5, operation button module 310 includes casing 311. Casing 311 is provided such that, when viewed from Z-axis direction, upper portion 311a that is on plus Z-axis direction side extends outward in Y-axis direction beyond lower portion 311b that is on minus Z-axis direction side. Upper portion 311a has a width in Y-axis direction that is larger than the width in Y-axis direction of opening portion 10b, and lower portion 311b has a width in Y-axis direction that is smaller than that of opening portion 10b. That is, casing 311 has installation surface 311c is formed as a result of upper portion 311a extending in Y-axis direction beyond lower portion 311b on both sides of upper portion 311a. Installation surface 311c is a surface (lower surface) of an extension portion of upper portion 311a extending in Y-axis direction beyond lower portion 311b on both sides of upper portion 311a, the surface being on minus Z-axis direction side.

With this configuration, casing 311 is disposed, with installation surface 311c being in contact with a periphery of opening portion 10b of mounting surface 10a. Accordingly, the position of casing 311 in Z-axis direction is uniquely determined, and casing 311 will not sink into arm rest 1a. That is, in casing 311, with installation surface 311c, casing 311 is restricted to move in minus Z-axis direction due to mounting surface 10a.

Also, casing 311 is configured such that the width in Y-axis direction of lower portion 311b is smaller than the width in Y-axis direction of opening portion 10b by an amount corresponding to a predetermined clearance. Accordingly, the position of casing 311 in Y-axis direction is restricted by edge 10bb and edge 10bd of opening portion 10b that oppose in Y-axis direction.

Casing 321 of connector module 320 has the same configuration as that of casing 311 shown in FIG. 5 described above, except that they have different lengths in X-axis direction, and thus a description thereof is omitted here.

[1-2. Detailed Configuration]

Next is a detailed description of structural elements of passenger operation device 100 that are used to attach passenger operation device 100 and connect the modules.

Figure 6:
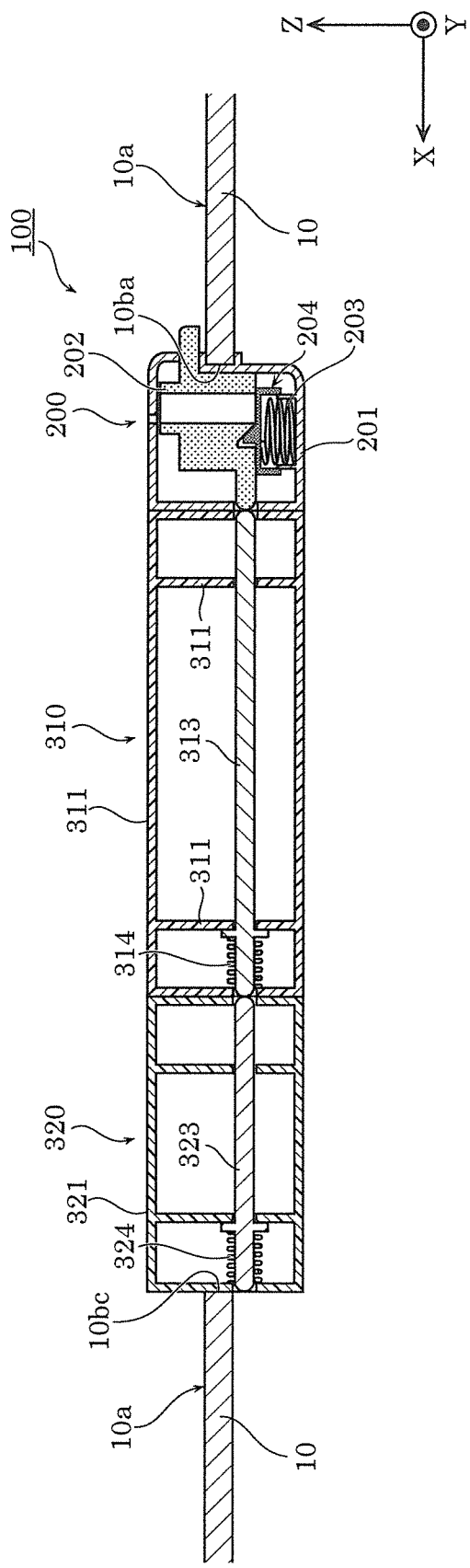
FIG. 6 is a diagram showing a VI-VI cross section taken along a plane parallel to ZX plane in FIG. 3.
Figure 7:
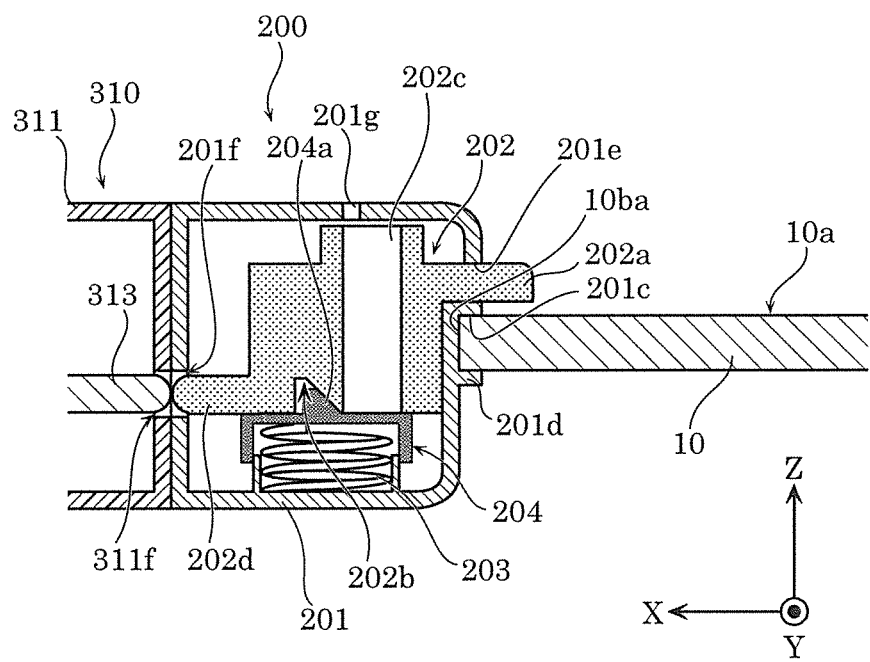
FIG. 7 is an enlarged view of the VI-VI cross section of the passenger operation device shown in FIG. 6, showing the vicinity of a coupling module.

FIG. 6 is a diagram showing a VI-VI cross section taken along a plane parallel to ZX plane in FIG. 3. To be specific, FIG. 6 is a diagram showing a state in which passenger operation device 100 is disposed in mounting surface 10a but is not fixed to mounting surface 10a. FIG. 7 is an enlarged view of the VI-VI cross section of passenger operation device 100 shown in FIG. 6, showing the vicinity of coupling module 200.

First, structural elements of coupling module 200 that are used to connect and attach connect coupling module 200 will be described in detail with reference to FIGS. 6 and 7.

As shown in FIGS. 6 and 7, coupling module 200 includes casing 201, moving member 202, spring 203, and holding member 204.

Casing 201 includes, on minus X-axis direction side, projecting portion 201d that sandwiches plate-like member 10 that has mounting surface 10a together with installation surface 201c in Z-axis direction. Projecting portion 201d is a portion that protrudes from a surface of casing 201 that is on minus X-axis direction side toward minus X-axis direction, and opposes installation surface 201c in Z-axis direction. Casing 201 is engaged with mounting surface 10a as a result of installation surface 201c and projecting portion 201d sandwiching, in Z-axis direction, edge 10ba of opening portion 10b of plate-like member 10 that has mounting surface 10a. Casing 201 is an example of a second casing.

Casing 201 further has through hole 201e in a surface that is on minus X-axis direction side at a position that is on plus Z-axis direction side with respect to installation surface 201c. Also, casing 201 further has through hole 201f in a surface that is on plus X-axis direction side at a position that is on minus Z-axis direction side with respect to plate-like member 10. Also, casing 201 further has through hole 201g in a surface that is on plus Z-axis direction side.

Moving member 202 includes button 202a, recess portion 202b, through hole 202c, and leading end portion 202d. In the state shown in FIGS. 6 and 7, button 202a protrudes toward plus X-axis direction, extends through through hole 201e of casing 201, and also protrudes toward minus X-axis direction beyond the surface of casing 201 that is on minus X-axis direction side. Moving member 202 is a member that moves toward plus X-axis direction in response to button 202a being pressed from minus X-axis direction side.

Recess portion 202b is provided on a side where holding member 204 of moving member 202 is disposed (in the present embodiment, minus Z-axis direction side). In the state shown in FIGS. 6 and 7, projecting portion 204a of holding member 204 is fitted into recess portion 202b. Recess portion 202b has an inclined surface that is inclined in a direction opposite to button 202a of moving member 202 as it extends toward holding member 204.

Through hole 202c extends through moving member 202 in Z-axis direction. Through hole 202c is formed on minus X-axis direction side of recess portion 202b. Through hole 202c is a portion for receiving projecting portion 204a of holding member 204 when moving member 202 is moved in plus X-axis direction. Also, through hole 202c is formed in an overlapping position with through hole 201g of casing 201 as viewed from Z-axis direction when moving member 202 is moved in plus X-axis direction.

Leading end portion 202d is formed in an overlapping position with through hole 201f of casing 201 as viewed from X-axis direction, and protrudes toward plus X-axis direction from moving member 202. Leading end portion 202d has an outer contour that is smaller than that of through hole 201f of casing 201 as viewed from X-axis direction. In the state shown in FIGS. 6 and 7, leading end portion 202d does not protrude from casing 201 toward plus X-axis direction. When moving member 202 is moved in plus X-axis direction, leading end portion 202d passes through through hole 201f of casing 201 and protrudes from the surface of casing 201 that is on plus X-axis direction side toward plus X-axis direction. Leading end portion 202d is disposed so as to oppose moving member 313 of operation button module 310 that is adjacent to coupling module 200 in plus X-axis direction.

Spring 203 is a compression spring that is disposed in holding member 204 on the opposite side of moving member 202 (in other words, on minus Z-axis direction side), and that exerts a biasing force in plus Z-axis direction side to press holding member 204 against moving member 202.

Holding member 204 is a member that is disposed between moving member 202 and spring 203. Holding member 204 includes projecting portion 204a that protrudes toward plus Z-axis direction. Projecting portion 204a has an inclined surface that fits into recess portion 202b of moving member 202 and that corresponds to the inclined surface of recess portion 202b. As described above, holding member 204 is biased toward plus Z-axis direction by spring 203.

Next, structural elements of operation button module 310 that are used to connect and attach operation button module 310 will be described in detail with reference to FIGS. 6 and 8.

Figure 8:
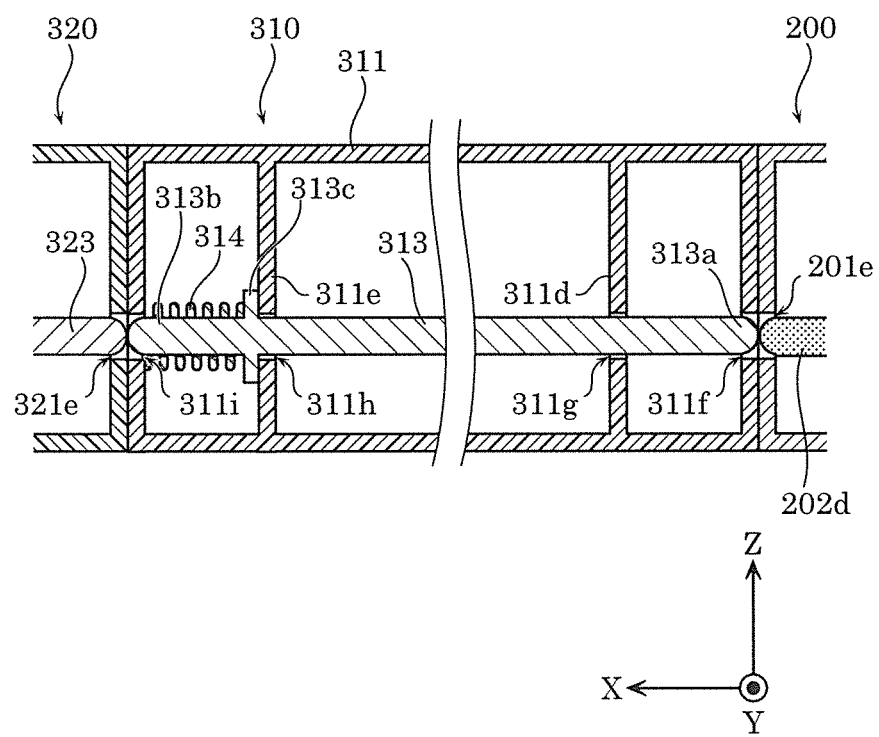
FIG. 8 is an enlarged view of the VI-VI cross section of the passenger operation device shown in FIG. 6, showing the vicinity of an operation button module.

FIG. 8 is an enlarged view of the VI-VI cross section of passenger operation device 100 shown in FIG. 6, showing the vicinity of operation button module 310.

As shown in FIGS. 6 and 8, operation button module 310 includes casing 311, moving member 313, and spring 314.

Casing 311 includes inner wall portions 311d and 311e that are parallel to YZ plane. Inner wall portions 311d and 311e are formed in an interior space of casing 311. Inner wall portion 311d is disposed on minus X-axis direction side of casing 311, and inner wall portion 311e is disposed on plus X-axis direction side of casing 311. Inner wall portion 311d has through hole 311g, and inner wall portion 311e has through hole 311h. Casing 311 further has through hole 311f on a surface that is on minus X-axis direction side. Casing 311 further has through hole 311i on a surface that is on plus X-axis direction side. Four through holes 311f, 311g, 311h, and 311i of casing 311 are formed in an overlapping position with each other as viewed from X-axis direction. Also, through hole 311f is disposed at a position where it opposes through hole 201e of casing 201 of coupling module 200 that is adjacent to operation button module 310. That is, when moving member 202 of coupling module 200 is moved in plus X-axis direction, leading end portion 202d of moving member 202 passes through through hole 311f.

Moving member 313 is an elongated rod-like member that extends in X-axis direction, and is disposed so as to pass through through hole 311g of inner wall portion 311d and through hole 311h of inner wall portion 311e.

End portion 313a of moving member 313 that is on minus X-axis direction side is disposed inward of through hole 311f, and is disposed at a position where it does not protrude from the surface of casing 311 that is on minus X-axis direction side toward minus X-axis direction. Also, end portion 313a of moving member 313 that is on minus X-axis direction side opposes leading end portion 202d of moving member 202 of coupling module 200 that is adjacent to operation button module 310 in minus X-axis direction.

End portion 313b of moving member 313 that is on plus X-axis direction side is disposed inward of through hole 311i, and is disposed at a position where it does not protrude from the surface of casing 311 that is on plus X-axis direction side toward plus X-axis direction. Also, end portion 313b of moving member 313 that is on plus X-axis direction side opposes moving member 323 of connector module 320 that is adjacent to operation button module 310 in plus X-axis direction.

Moving member 313 includes projecting portion 313c that protrudes toward a direction that crosses X-axis direction (for example, Z-axis direction or Y-axis direction) at a position that is on plus X-axis direction side of inner wall portion 311e. Projecting portion 313c is formed in an overlapping position with through hole 311h of inner wall portion 311e as viewed from X-axis direction. That is, with moving member 313, because projecting portion 313c and inner wall portion 311e come into an interfering relationship with each other, the movement of projecting portion 313c in minus X-axis direction beyond inner wall portion 311e is restricted. In the present embodiment, projecting portion 313c is a collar shaped (flange shaped) portion that is formed to extend from moving member 313 along a surface of moving member 313 that is vertical to X-axis direction. Moving member 313 is configured such that, in a state in which projecting portion 313c is in contact with inner wall portion 311e, two end portions 313a and 313b of moving member 313 are in positions where they do not protrude from opposite ends of casing 311 in X-axis direction. Also, because moving member 313 passes through two inner wall portions 311d and 311e that are disposed in different positions in X-axis direction within casing 311, the movement of moving member 313 in Y-axis direction and Z-axis direction is restricted by two inner wall portions 311d and 311e. That is, moving member 313 is held in a predetermined position of casing 311 in Y-axis direction and Z-axis direction by through holes 311g and 311h of two inner wall portions 311d and 311e.

Spring 314 is passed through by end portion 313b of moving member 313 that is on plus X-axis direction side, and is disposed on plus X-axis direction side of projecting portion 313c. Spring 314 is a compression spring that is disposed between projecting portion 313c and a wall of casing 311 that is on plus X-axis direction side, and that biases moving member 313 toward minus X-axis direction. That is, because moving member 313 is biased toward minus X-axis direction by spring 314, projecting portion 313c is kept in contact with inner wall portion 311e.

Next, structural elements of connector module 320 will be described in detail with reference to FIGS. 6 and 9.

Figure 9:
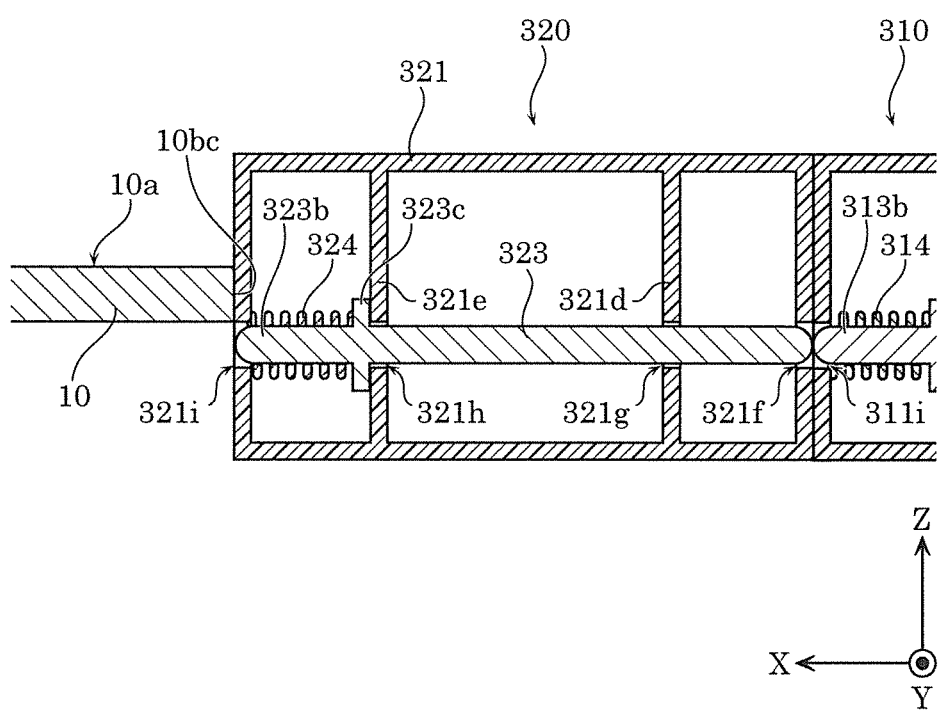
FIG. 9 is an enlarged view of the VI-VI cross section of the passenger operation device shown in FIG. 6, showing the vicinity of a connector module.

FIG. 9 is an enlarged view of the VI-VI cross section of passenger operation device 100 shown in FIG. 6, showing the vicinity of connector module 320.

As shown in FIGS. 6 and 9, connector module 320 includes casing 321, moving member 323, and spring 324. The structural elements of connector module 320 that are used to connect and attach connector module 320 are the same as the structural elements of operation button module 310 that are used to connect and attach operation button module 310 described above, and thus a description thereof is omitted. To be specific, the structural elements of connector module 320 that are used to connect and attach connector module 320 can be explained in the same manner by replacing the reference numerals 310 to 314 of operation button module 310 with reference numerals 320 to 324.

As shown in FIGS. 6 and 9, through holes 311f to 311i of casing 311 and through holes 321f to 321i of casing 321 are all disposed in an overlapping position with each other as viewed from X-axis direction. Also, through holes 311f to 311i, and 321f to 321i are formed such that their upper end is substantially flush with the lower surface of plate-like member 10.

The present embodiment is configured such that connector module 320 is disposed at an end of passenger operation device 100 that is on plus X-axis direction side, but the same applies to the configuration in which operation button module 310 and connector module 320 are provided in reversed positions. That is, in this case, operation button module 310 is configured such that, when moving member 313 is moved in plus X-axis direction, the upper surface of end portion 313b of moving member 313 that is on plus X-axis direction side and that protrudes from casing 311 in plus X-axis direction comes into contact with the lower surface of plate-like member 10, in the same manner as connector module 320 according to the present embodiment.

[1-3. Attachment Step]

Next, a step of fixing passenger operation device 100 to mounting surface 10a after passenger operation device 100 has been disposed as shown in FIG. 6 will be described with reference to FIGS. 10 and 11.

Figure 10:
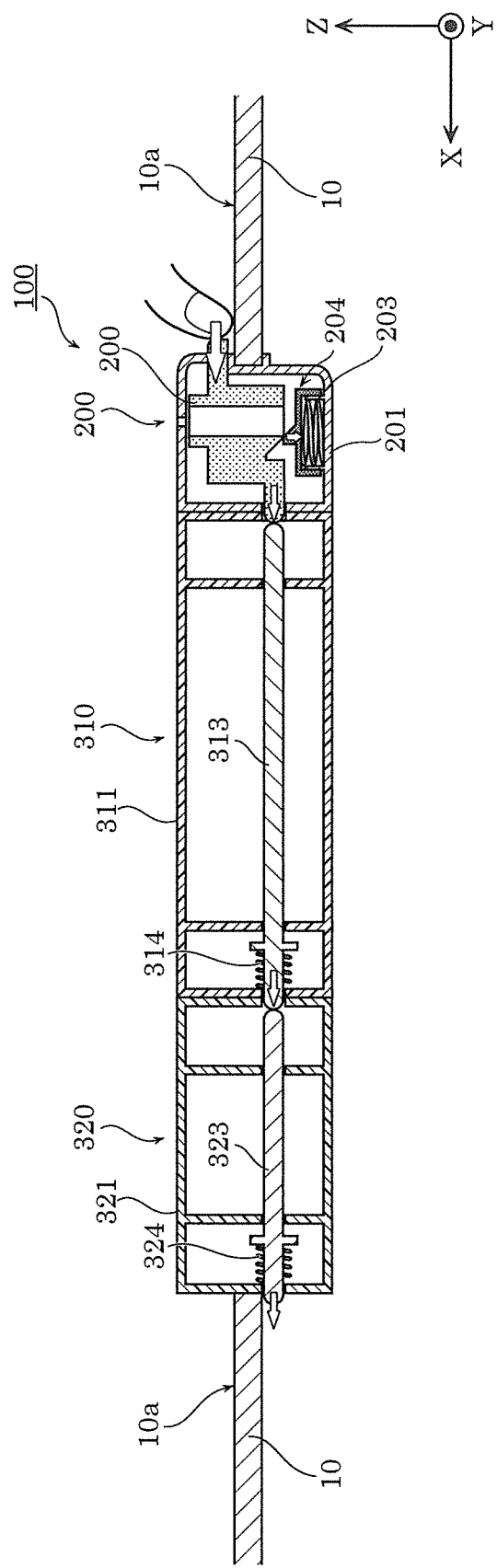
FIG. 10 is a diagram showing a process of fixing the passenger operation device.

FIG. 10 is a diagram showing a process of fixing passenger operation device 100. FIG. 11 is a diagram showing a state in which passenger operation device 100 is fixed to mounting surface 10a.

After passenger operation device 100 has been disposed in mounting surface 10a, as shown in FIG. 10, when a user presses button 202a of moving member 202 of coupling module 200 toward plus X-axis direction, moving member 202 moves toward plus X-axis direction. In response to moving member 202 moving toward plus X-axis direction, the inclined surface of recess portion 202b moves toward plus X-axis direction, the inclined surface of projecting portion 204a of holding member 204 is forced out on minus Z-axis direction side by the movement of the inclined surface of recess portion 202b, and holding member 204 moves toward minus Z-axis direction.

Also, leading end portion 202d of moving member 202 of coupling module 200 moves toward plus X-axis direction so as to force out, in plus X-axis direction, end portion 313a of moving member 313 of operation button module 310 that is on minus X-axis direction side. In response thereto, moving member 313 of operation button module 310 also moves toward plus X-axis direction by a distance that is substantially equal to the distance of movement of moving member 202 in plus X-axis direction.

Also, likewise, end portion 313b of moving member 313 of operation button module 310 that is on plus X-axis direction side moves toward plus X-axis direction so as to force out, in plus X-axis direction side, end portion 323a of moving member 323 of connector module 320 that is on minus X-axis direction side. In response thereto, moving member 323 of connector module 320 also moves toward plus X-axis direction by a distance that is substantially equal to the distance of movement of moving members 202 and 313 in plus X-axis direction.

Figure 11:
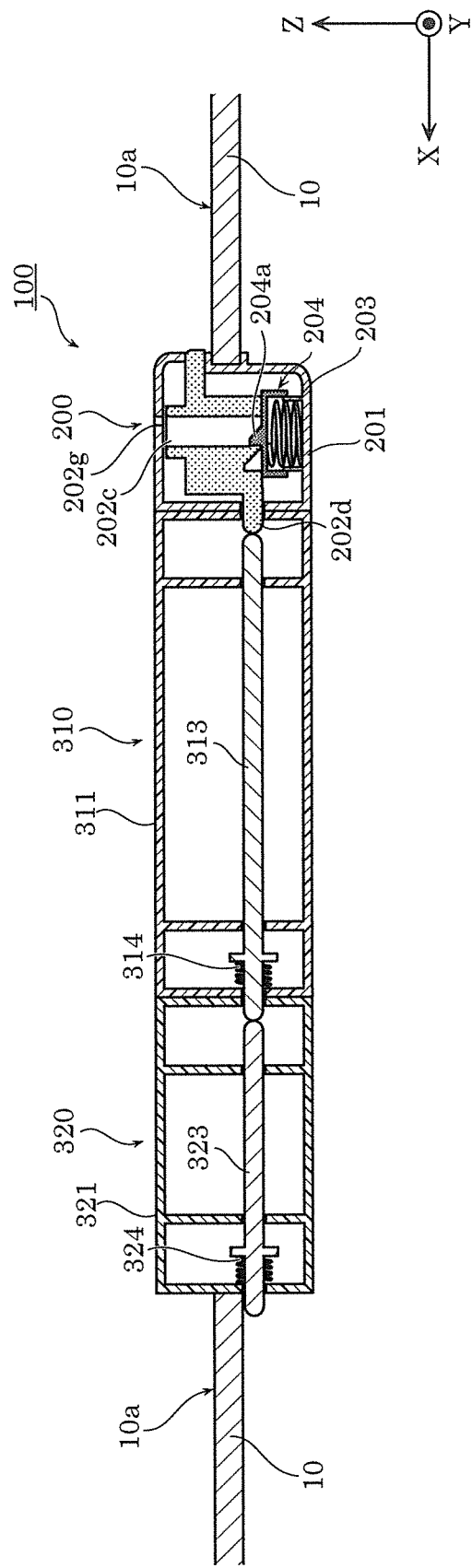
FIG. 11 is a diagram showing a state in which the passenger operation device is fixed to the mounting surface.

In the state shown in FIG. 10, when the user further presses button 202a in plus X-axis direction as shown in FIG. 11, moving member 202 further moves toward plus X-axis direction, and through hole 202c of moving member 202 moves to the position of projecting portion 204a of holding member 204. Because holding member 204 is biased toward plus Z-axis direction by spring 203, projecting portion 204a is fitted into through hole 202c. In the state in which projecting portion 204a of holding member 204 is fitted in through hole 202c, the surface of projecting portion 204a that is on plus X-axis direction side is in contact with an inner surface of a portion that forms through hole 202c, the inner surface being on minus X-axis direction side. Accordingly, projecting portion 204a of holding member 204 restricts the movement of moving member 202 in minus X-axis direction.

At this time, leading end portion 202d of moving member 202 of coupling module 200 is inserted into through hole 311f of operation button module 310. Coupling module 200 and operation button module 310 are thereby restricted in Z-axis direction, and coupled to each other.

Likewise, moving member 313 of operation button module 310 is inserted into through hole 321f of connector module 320. Operation button module 310 and connector module 320 are thereby restricted in Z-axis direction, and coupled to each other.

Then, as a result of end portion 323b of moving member 323 of connector module 320 that is on plus X-axis direction side moving toward plus X-axis direction, end portion 323b protrudes from through hole 321i of casing 321 toward plus X-axis direction. That is, when moving member 323 of connector module 320 is moved in plus X-axis direction side, the upper surface of end portion 323b of moving member 323 that is on plus X-axis direction side and that protrudes from casing 321 toward plus X-axis direction comes into contact (technically, not necessarily come into contact) with the lower surface of plate-like member 10. The movement of connector module 320 toward plus Z-axis direction with respect to plate-like member 10 is thereby restricted. As described with reference to FIG. 5, the movement of operation button module 310 and connector module 320 toward minus Z-axis direction with respect to plate-like member 10 is restricted by installation surfaces 311c and 321c, respectively, and thus as a result of the movement of passenger operation device 100 in plus Z-axis direction side being restricted by moving member 323, the movement of passenger operation device 100 toward opposite sides in Z-axis direction is restricted. Accordingly, because the movement of passenger operation device 100 toward Z-axis direction is restricted, and the movement of passenger operation device 100 toward X-axis direction and Y-axis direction is restricted by opening portion 10b, passenger operation device 100 is fixed to mounting surface 10a.

In operation button module 310 and connector module 320, moving members 313 and 323 are biased toward minus X-axis direction by springs 314 and 324. That is, because the movement of moving member 202 of coupling module 200 in minus X-axis direction side is restricted by holding member 204, despite the fact that moving members 313 and 323 are biased toward minus X-axis direction by springs 314 and 324, the movement of moving members 313 and 323 in minus X-axis direction is restricted.

[1-4. Detaching Step]

Next, a step of detaching passenger operation device 100 from mounting surface 10a after passenger operation device 100 has been fixed to mounting surface 10a as shown in FIG. 11 will be described with reference to FIG. 12.

Figure 12:
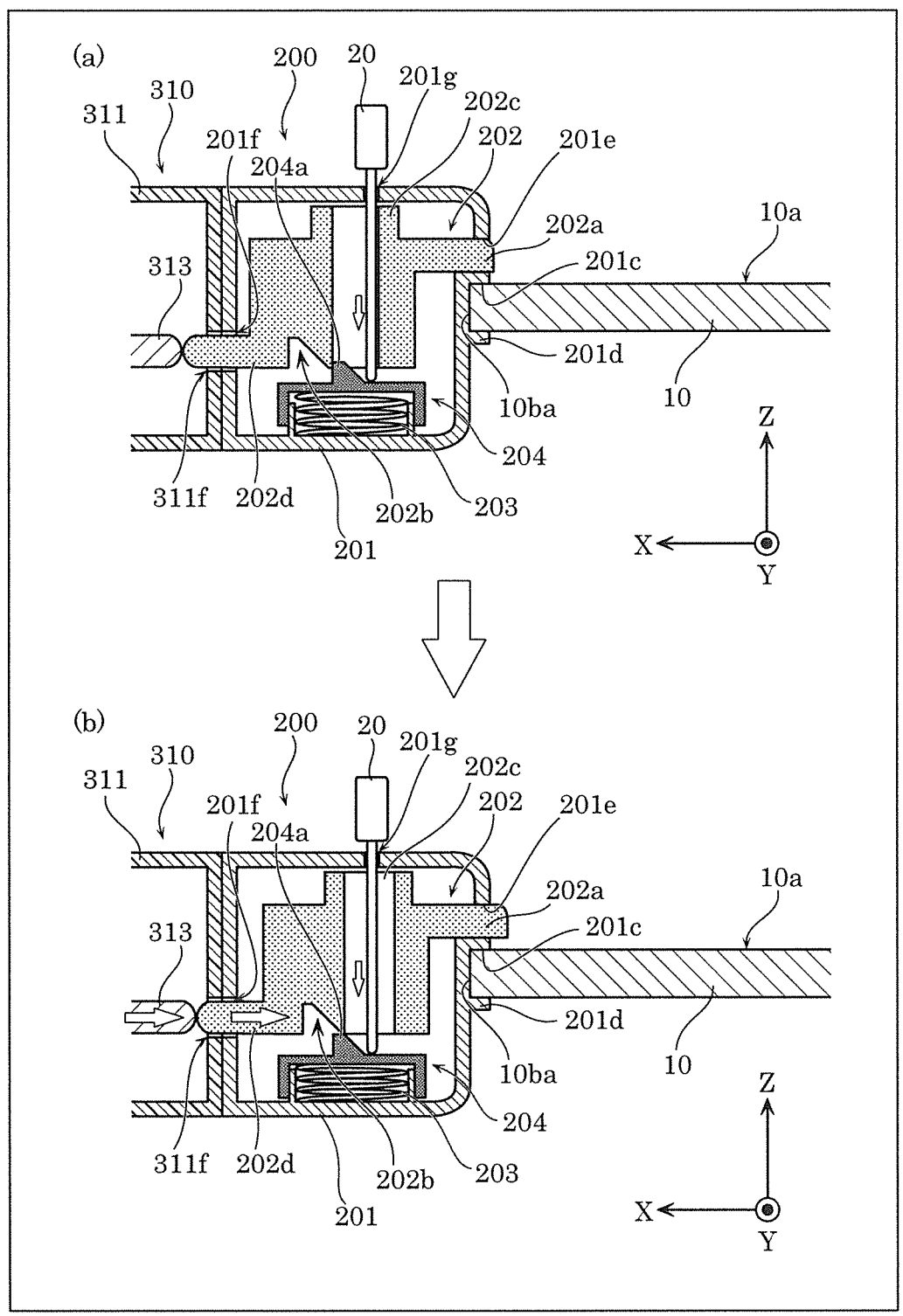
FIG. 12 is a diagram illustrating a step of detaching the passenger operation device.

FIG. 12 is a diagram illustrating the step of detaching passenger operation device 100.

First, the position of moving member 202 of coupling module 200 shown in FIG. 6 will be defined as a first position, and the position of moving member 202 of coupling module 200 shown in FIG. 11 will be defined as a second position.

In the state shown in FIG. 11, rod 20 such as, for example, a driver is inserted into through hole 201g of casing 201 of coupling module 200. In the state in which passenger operation device 100 is fixed to mounting surface 10a, through hole 201g of casing 201 and through hole 202c of moving member 202 are disposed in an overlapping position as viewed from Z-axis direction. Accordingly, when rod 20 is inserted into through hole 201g of casing 201, rod 20 passes through through hole 202c of moving member 202, and reaches holding member 204.

Then, when the user further moves rod 20 in minus Z-axis direction so as to press holding member 204 downward in minus Z-axis direction, as shown in (a) in FIG. 12, holding member 204 moves toward minus Z-axis direction. As a result, as shown in (b) in FIG. 12, the engagement between projecting portion 204a of holding member 204 and through hole 202c of moving member 202 in Z-axis direction is disengaged, and moving members 202, 313, and 323 move in minus X-axis direction because moving members 202, 313, and 323 are biased in minus X-axis direction side by springs 314 and 324 of operation button module 310 and connector module 320. That is, moving member 202 moves from the second position shown in FIG. 11 back to the first position shown in FIG. 6, and moving members 313 and 323 also move back to their original state shown in FIG. 6. Thus, the connection between coupling module 200, operation button module 310, and connector module 320 by moving members 202 and 313 is disconnected, and the engagement of passenger operation device 100 with mounting surface 10a is disengaged. Accordingly, passenger operation device 100 can be taken out from mounting surface 10a.

[1-5. Advantageous Effects, etc.]

Passenger operation device 100 that is a module attachment device according to the present embodiment includes coupling module 200, operation button module 310, and connector module 320. Operation button module 310 and connector module 320 respectively include casings 311 and 321, and moving members 313 and 323 that are configured such that end portions 313b and 323b that are provided on plus X-axis direction side protrude from casings 311 and 322 as a result of end portions 313a and 323a that are provided on minus X-axis direction side being pressed to pass through casings 311 and 322. Coupling module 200 includes moving member 202 that is disposed so as to be capable of pressing end portion 313a of moving member 313 of operation button module 310 that is on minus X-axis direction, and coupling module 200 is engaged with mounting surface 10a. End portion 313b of moving member 313 on plus X-axis direction side that protrudes from casing 311 as a result of being pressed by moving member 202 of coupling module 200 presses end portion 323a of moving member 323 of adjacent connector module 320, end portion 323a being on minus X-axis direction side, and thereby comes into engagement with connector module 320. Also, end portion 323a of moving member 323 on plus X-axis direction side that protrudes from casing 321 as a result of being pressed by moving member 313 of operation button module 310 moves to a position where it opposes the lower surface of plate-like member 10 that forms mounting surface 10a, and thereby comes into engagement with mounting surface 10a.

With this configuration, by simply pressing moving member 202 of coupling module 200, coupling module 200, operation button module 310, and connector module 320 can be coupled with the use of moving members 202 and 313 and engaged with mounting surface 10a with the use of moving member 323. Accordingly, an attachment operation for attachment to mounting surface 10a can be performed without the use of a tool, and thus the attachment operation can be simplified. Also, the member that is engaged with mounting surface 10a can be constructed with a minimum number of components, and thus a compact configuration can be achieved.

Also, the present embodiment is configured such that when moving member 202 of coupling module 200 is moved in plus X-axis direction, moving member 313 of operation button module 310 that is adjacent to coupling module 200 is moved in plus X-axis direction so as to cause end portion 313b of moving member 313 that is on plus X-axis direction side to protrude from casing 311 of operation button module 310. Then, end portion 323b of moving member 323 of connector module 320 that is on plus X-axis direction side, which is disposed in the farthest position from moving member 202, protrudes from casing 321 of connector module 320 toward plus X-axis direction, and thereby comes into engagement with mounting surface 10a.

With this configuration, coupling module 200, operation button module 310, and connector module 320 are aligned in X-axis direction, and thus moving members 313 and 323 can be easily moved in plus X-axis direction by simply moving moving member 202 toward plus X-axis direction. Accordingly, the connection between coupling module 200, operation button module 310, and connector module 320, as well as the engagement of coupling module 200, operation button module 310, and connector module 320 with mounting surface 10a can be achieved with a simple configuration.

Also, in the present embodiment, in operation button module 310 and connector module 320 that are adjacent to each other, moving members 313 and 323 of operation button module 310 and connector module 320 are disposed so as to oppose each other in X-axis direction.

Accordingly, moving member 323 of connector module 320 can be easily caused to protrude toward plus X-axis direction when moving member 313 of operation button module 310 is pressed toward plus X-axis direction. With this configuration, the connection between operation button module 310 and connector module 320, as well as the engagement of operation button module 310 and connector module 320 with mounting surface 10a can be easily achieved.

Also, in the present embodiment, moving member 202 of coupling module 200 is disposed so as to oppose moving member 313 of operation button module 310 that is disposed adjacent to coupling module 200.

Accordingly, moving member 313 of operation button module 310 can be easily pressed toward plus X-axis direction by moving moving member 202 of coupling module 200 toward plus X-axis direction.

Embodiment 2

Next, passenger operation device 100A according to Embodiment 2 will be described with reference to FIGS. 13 and 14.

[2-1. Configuration]

Figure 13:
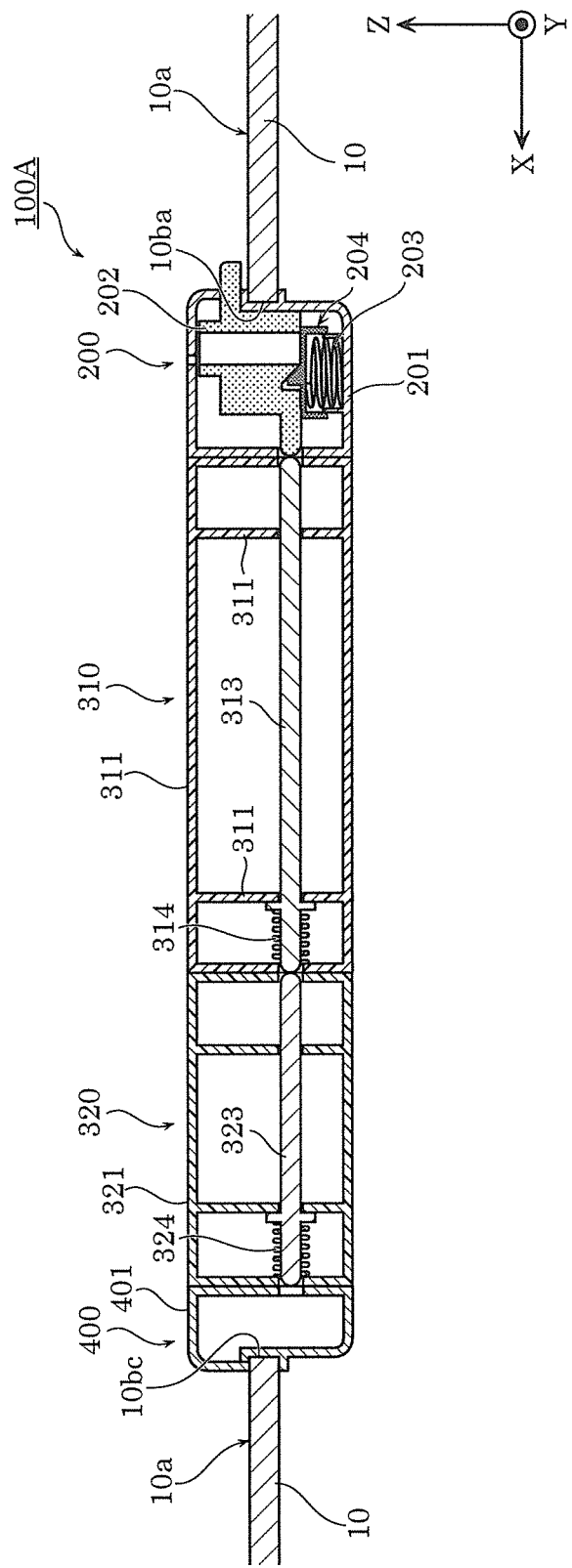
FIG. 13 is a diagram showing a cross section of a passenger operation device according to Embodiment 2, the cross section corresponding to the VI-VI cross section taken along a plane parallel to ZX plane in FIG. 3.

FIG. 13 is a diagram showing a cross section of a passenger operation device according to Embodiment 2, the cross section corresponding to the VI-VI cross section taken along a plane parallel to ZX plane. FIG. 14 is an enlarged view of the cross section of passenger operation device 100A shown in FIG. 13, showing the vicinity of coupling module 400.

Passenger operation device 100A is different from passenger operation device 100 according to Embodiment 1 in that passenger operation device 100A includes coupling module 400 in addition to coupling module 200, operation button module 310, and connector module 320. That is, coupling module 200, operation button module 310, and connector module 320 of passenger operation device 100A have the same configurations as those of coupling module 200, operation button module 310, and connector module 320 of passenger operation device 100 according to Embodiment 1. Accordingly, for the sake of convenience of the description, the members that have the same shape and function as those of Embodiment 1 described above are given the same reference numerals, and a description thereof is omitted.

In the present embodiment, coupling module 200 is an example of a fourth module, operation button module 310 and connector module 320 are examples of third modules, and coupling module 400 is an example of a fifth module.

Coupling module 400 is provided on the opposite side of coupling module 200 across operation button module 310 and connector module 320 in X-axis direction. Coupling module 400 includes casing 401. Casing 401 has an inverted configuration of casing 201 of coupling module 200 in X-axis direction without through holes 201e and 201g of casing 201. Installation surface 401c, projecting portion 401d, and through hole 401e of casing 401 correspond to installation surface 201c, projecting portion 201d, and through hole 201f of casing 401, respectively.

Figure 14:
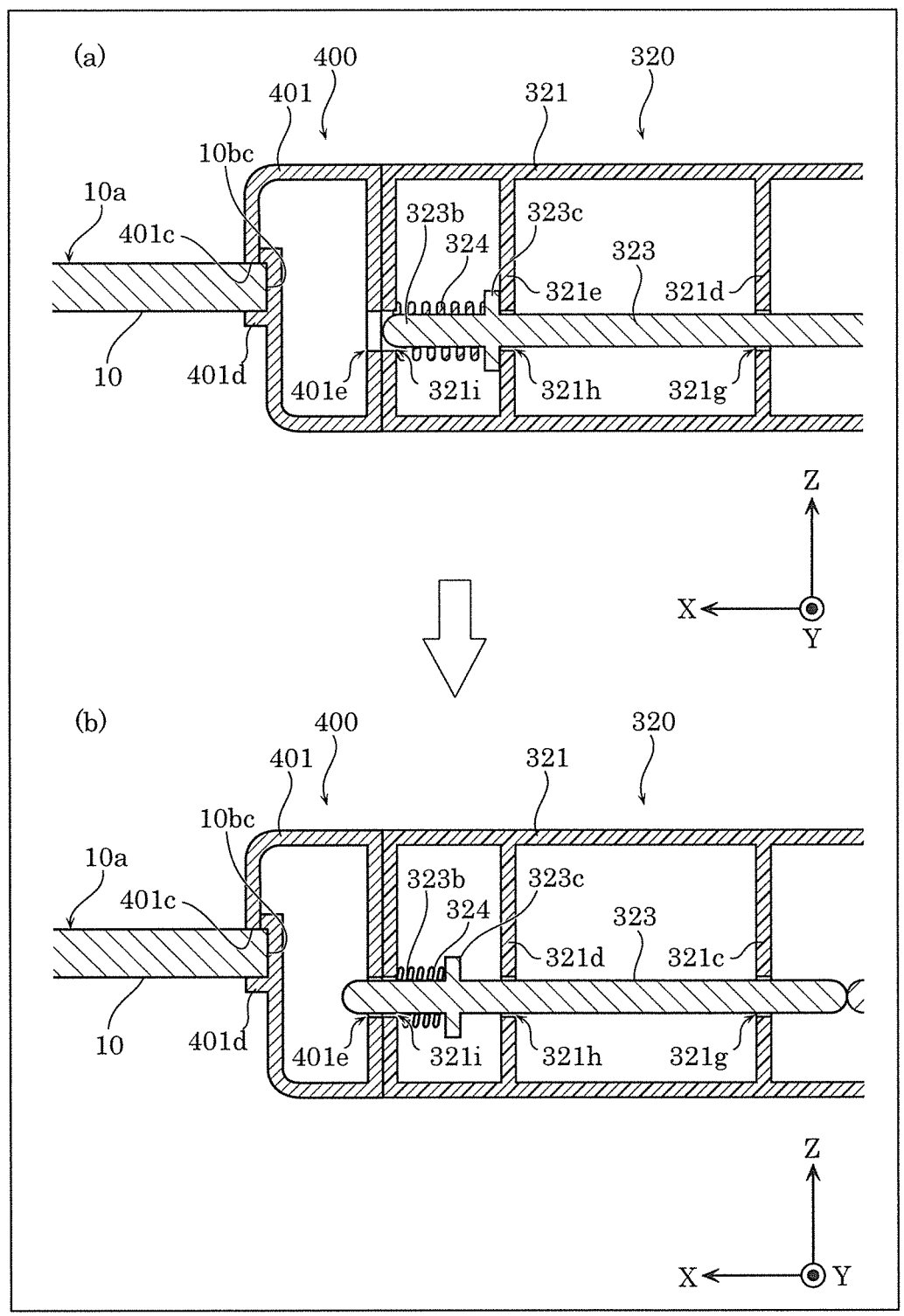
FIG. 14 is an enlarged view of the cross section of the passenger operation device shown in FIG. 13, showing the vicinity of a coupling module.

As shown in FIGS. 13 and 14, coupling module 400 is disposed in edge 10bc of opening portion 10b that is on plus X-axis direction side, and is engaged with mounting surface 10a by sandwiching edge 10bc of opening portion 10b in Z-axis direction between installation surface 401c and projecting portion 401d of casing 401.

Through hole 401e of casing 401 of coupling module 400 is provided at a position where it opposes, in X-axis direction, through hole 321i of casing 321 of adjacent connector module 320.

Accordingly, as in Embodiment 1, when moving member 202 of coupling module 200 is moved in plus X-axis direction by the user so as to fix passenger operation device 100A to mounting surface 10a, as can be seen from the state shown in (a) in FIG. 14 to the state shown in (b) in FIG. 14, moving member 323 of connector module 320 protrudes from casing 321 and passes through through hole 401e of casing 401 of coupling module 400.

As described above, with passenger operation device 100A according to Embodiment 2, because moving member 323 of connector module 320 passes through coupling module 400 that is engaged with mounting surface 10a, connector module 320 and coupling module 400 are coupled. Because coupling module 400 has already been engaged with mounting surface 10a, as a result of connector module 320 and coupling module 400 being coupled, passenger operation device 100A is fixed to mounting surface 10a. Coupling module 200, operation button module 310, and connector module 320 are coupled to each other based on the same principle as that of passenger operation device 100 according to Embodiment 1.

[2-2. Advantageous Effects, etc.]

Passenger operation device 100A that is the module attachment device according to the present embodiment includes coupling module 200, operation button module 310, connector module 320, and coupling module 400. Operation button module 310 and connector module 320 respectively include casings 311 and 321, and moving members 313 and 323 that are configured such that end portions 313b and 323b that are provided on plus X-axis direction side protrude from casings 311 and 322 as a result of end portions 313a and 323a that are provided on minus X-axis direction side being pressed through casings 311 and 322. Coupling module 200 includes moving member 202 that is disposed so as to be capable of pressing end portion 313a of moving member 313 of operation button module 310 that is on minus X-axis direction, and coupling module 200 is engaged with mounting surface 10a. Coupling module 400 is engaged with mounting surface 10a. End portion 313b of moving member 313 on plus X-axis direction side that protrudes from casing 311 as a result of being pressed by moving member 202 of coupling module 200 presses end portion 323a of moving member 323 of adjacent connector module 320 that is on minus X-axis direction side, and thereby comes into engagement with connector module 320. Also, end portion 323a of moving member 323 on plus X-axis direction side that protrudes from casing 321 as a result of being pressed by moving member 313 of operation button module 310 engages with coupling module 400.

With this configuration, passenger operation device 100A is fixed to mounting surface 10a as a result of moving member 323 of connector module 320 engaging with casing 401 of coupling module 400 that has already been engaged with mounting surface 10a. Accordingly, passenger operation device 100A can be fixed to mounting surface 10a even when the position of moving member 323 in Z-axis direction is not a position where moving member 323 is substantially in contact with the lower surface of plate-like member 10 that has mounting surface 10a. Thus, even if, for example, the positions of moving members 202, 313, and 323 in Z-axis direction protruding from casings 201, 311, and 321 are shifted toward minus Z-axis direction, passenger operation device 100A can be fixed to mounting surface 10a. It is therefore possible to increase the accommodation space in modules 310 and 320, and improve the degree of freedom in the size of the devices accommodated in modules 310 and 320.

Other Embodiments

Although embodiments of the present disclosure have been described above, the present disclosure is not limited to the embodiments given above, and various modifications can be made without departing from the scope of the present disclosure.

(A)

In Embodiments 1 and 2 given above, moving members 313 and 323 of operation button module 310 and connector module 320 are configured such that end portions 313b and 313b that are on plus X-axis direction side protrude from casings 311 and 321 as a result of end portions 313a and 323a that are on minus X-axis direction side being pressed. That is, moving members 313 and 323 are configured such that as a result of their first ends being pressed, the second ends protrude from casings 311 and 321. However, in addition to this configuration, it is also possible to use a configuration in which as a result of the second ends being pressed, the first ends protrude from casings 311 and 321.

Figure 15:
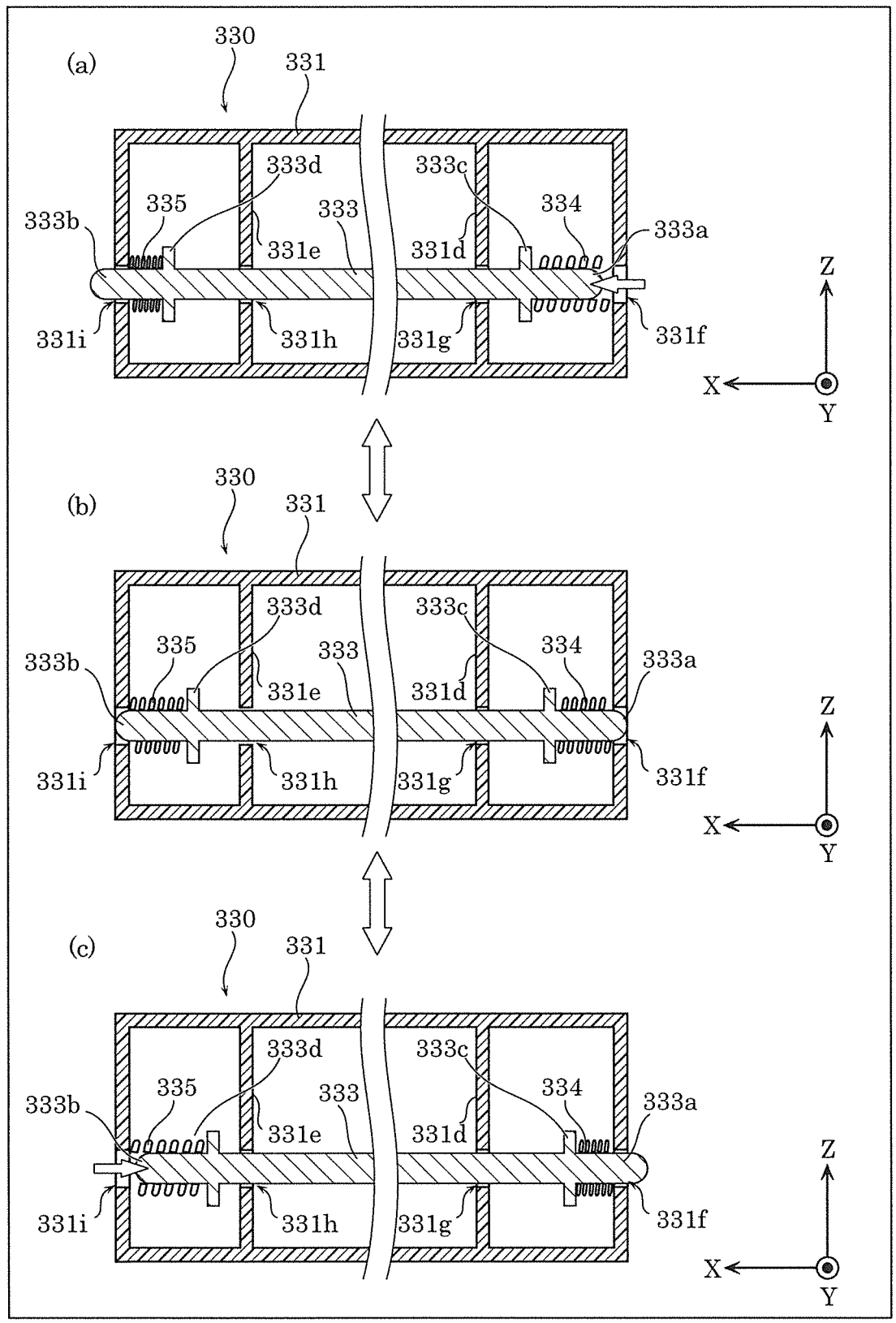
FIG. 15 is a diagram showing a cross section of a module according to Additional Embodiment (A), the cross section corresponding to the VI-VI cross section shown in FIG. 3.

FIG. 15 is a diagram showing a cross section of module 330 according to Additional Embodiment (A), the cross section corresponding to the VI-VI cross section shown in FIG. 3. To be specific, (a) in FIG. 15 is a diagram showing a state in which end portion 331a of moving member 333 of module 330 that is on minus X-axis direction side is pressed. (b) in FIG. 15 is a diagram showing a state in which moving member 333 of module 330 is not pressed. (c) in FIG. 15 is a diagram showing a state in which end portion 333b of moving member 333 of module 330 that is on plus X-axis direction side is pressed.

As shown in FIG. 15, module 330 includes casing 331, moving member 333, and springs 334 and 335. Module 330 is different from moving member 313 of operation button module 310 in that projecting portions 333c and 333d are formed on opposite ends of moving member 333 in X-axis direction. Also, module 330 is different from operation button module 310 in that springs 334 and 335 are disposed on opposite ends of moving member 333 in X-axis direction. Hereinafter, a detailed configuration of module 330 will be described.

Casing 331 has the same configuration as that of casing 311 of operation button module 310 according to Embodiment 1, except that casing 331 includes inner wall portions 331d and 331e. Also, casing 331 has four through holes 331f, 331g, 331h, and 331i, as in casing 311.

Moving member 333 includes projecting portions 333c and 333d that protrude toward a direction that crosses X-axis direction (for example, Z-axis direction or Y-axis direction) at a position that is on minus X-axis direction side of inner wall portion 331d and at a position that is plus X-axis direction side of inner wall portion 331e, respectively. Projecting portion 333c and inner wall portion 331d are spaced apart by a predetermined spacing, and projecting portion 333d and inner wall portion 331e are spaced apart by a predetermined spacing. The predetermined spacing may be greater than or equal to the distance by which moving member 333 is pressed into casing 331.

Spring 334 is passed through by end portion end portion 333a of moving member 333 that is on minus X-axis direction side, and is disposed on minus X-axis direction side of projecting portion 333c. Spring 334 is a compression spring that is disposed between a wall of casing 331 that is on minus X-axis direction side and projecting portion 333c, and that biases moving member 333 toward plus X-axis direction.

Spring 335 is passed through by end portion 333b of moving member 333 that is on plus X-axis direction side, and is disposed on plus X-axis direction side of projecting portion 333d. Spring 335 is a compression spring that is disposed between a wall of casing 331 that is on plus X-axis direction side and projecting portion 333d, and that biases moving member 333 toward minus X-axis direction.

Because moving member 333 is biased from opposite ends in X-axis direction by both springs 334 and 335, if not pressed in X-axis direction, as shown in (b) in FIG. 15, moving member 333 does not protrude from the end portions of casing 331 in X-axis direction.

Here, as shown in (a) in FIG. 15, in response to end portion 333a that is on minus X-axis direction side being pressed, moving member 333 moves toward plus X-axis direction. End portion 333b of moving member 333 that is on plus X-axis direction side thereby protrudes from casing 331 toward plus X-axis direction.

Also, as shown in (c) in FIG. 15, in response to end portion 333b that is on plus X-axis direction side being pressed, moving member 333 moves toward minus X-axis direction. End portion 333a of moving member 333 that is on minus X-axis direction side thereby protrudes from casing 331 in minus X-axis direction.

Operation button module 310 and connector module 320 according to Embodiment 1 may be replaced by module 330 shown in FIG. 15. With this configuration, module 330 can be fixed to mounting surface 10a together with coupling module 200 irrespective of the orientation of module 330 in X-axis direction. It is also of course possible to use module 330 instead of operation button module 310 and connector module 320 according to Embodiment 2. In Embodiment 2 as well, module 330 can be fixed to mounting surface 10a by being coupled to coupling module 200 or coupling module 400.

(B)

In Embodiments 1 and 2 given above, rod-like members that are elongated in X-axis direction are used as moving members 313 and 323, but moving members 313 and 323 are not necessarily rod-like members as long as they are members that are continuous in X-axis direction and extend across the width of casings 311 and 321 in X-axis direction. That is, the moving members may be plate-like members. Also, the moving members are not necessarily continuous in X-axis direction, and may be configured to, when pressed from the first end side in X-axis direction, protrude from the second end side, so as to provide a mechanism that transfers a force created by pressing from the first end in X-axis direction toward the second end within casings 311 and 321. The moving members may be composed of, for example, cylinders such as oil cylinders or gas cylinders.

(C)

In Embodiments 1 and 2 given above, moving member 202 of coupling module 200 is a member for transferring a force created by pressing from minus X-axis direction side toward plus X-axis direction, but the configuration is not limited thereto. Moving member 202 of coupling module 200 may be a member for transferring a force created by pressing from a direction (for example, Z-axis direction) that crosses X-axis direction toward plus X-axis direction. The configuration in which the moving member is moved in plus X-axis direction from a direction that is different from X-axis direction will be described with reference to FIGS. 16 and 17.

Figure 16:
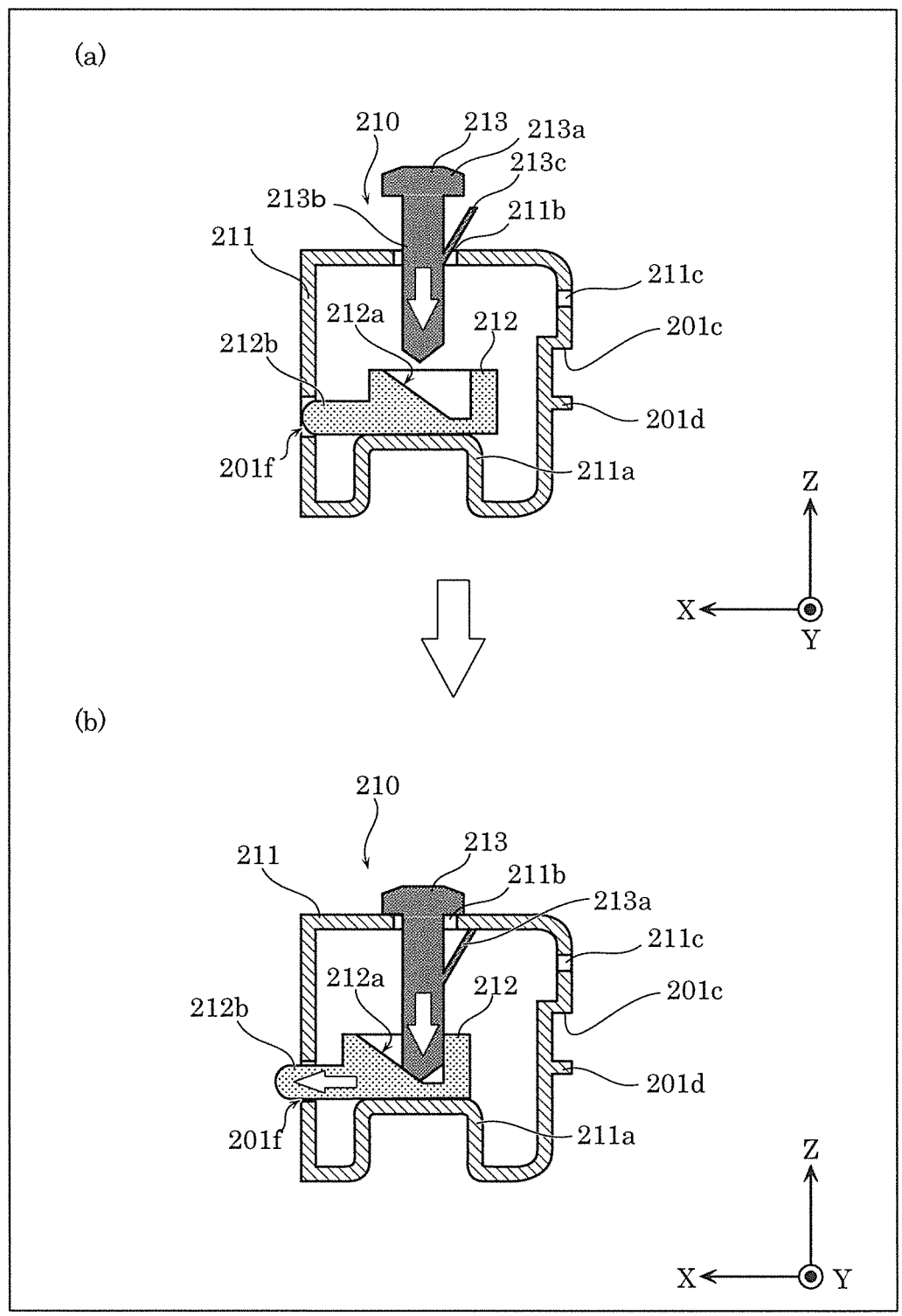
FIG. 16 is a diagram illustrating a process of moving a moving member of a coupling module in plus X-axis direction.
Figure 17:
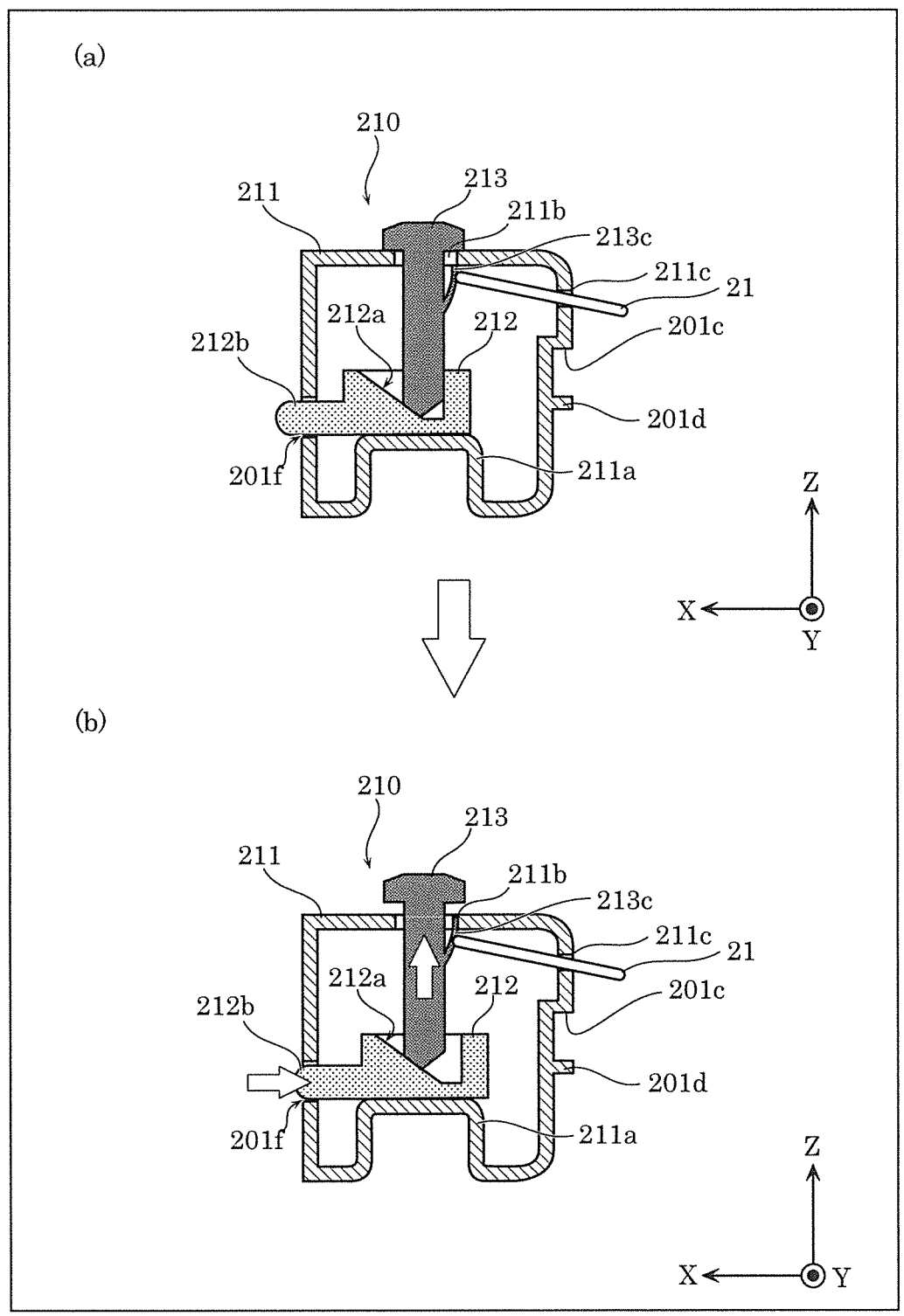
FIG. 17 is a diagram illustrating a process of moving the moving member of the coupling module back from plus X-axis direction.

FIGS. 16 and 17 are diagrams showing a configuration of coupling module 210 according to Additional Embodiment (C). FIG. 16 is a diagram illustrating a process of moving moving member 212 of coupling module 210 toward plus X-axis direction. FIG. 17 is a diagram illustrating a process of moving moving member 212 of coupling module 210 back from plus X-axis direction.

As shown in FIGS. 16 and 17, coupling module 210 includes casing 211, moving member 212, and pin 213.

Casing 211 has the same configuration as casing 201 of coupling module 200 according to Embodiments 1 and 2, and includes the same installation surface 201c, projecting portion 201d, and through hole 201f. Accordingly, the same reference numerals are given to these structural elements, and a description thereof is omitted. Casing 211 further includes support 211a, and through holes 211b, and 211c.

Support 211a is a portion that is disposed on minus Z-axis direction side, and where moving member 212 is placed. Support 211a is a portion where moving member 212 is disposed at a position where leading end portion 212b of moving member 212 overlaps with through hole 201f as viewed from X-axis direction. Support 211a may be omitted if the moving member is configured such that the end portion of the moving member overlaps with through hole 201f as viewed from X-axis direction.

Through hole 211b is formed at a position that is on plus Z-axis direction side of casing 211, and is passed through by pin 213. Through hole 211c is formed at a position that is on minus X-axis direction side of casing 211, and is used when pin 213 is removed.

Moving member 212 has inclined surface 212a that is inclined in plus X-axis direction as it extends in plus Z-axis direction, and leading end portion 212b that protrudes toward plus X-axis direction. Leading end portion 212b has the same configuration as that of leading end portion 202d of moving member 202 according to Embodiments 1 and 2, and thus a description thereof is omitted.

Pin 213 includes head portion 213a, shaft portion 213b, and stick-out portion 213c. Shaft portion 213b is an elongated rod-like portion that extends in a predetermined direction, and is inclined so as to have a tapered tip end. Head portion 213a is a radially extending portion that is formed on an end portion that is opposite to the tip end of shaft portion 213b. Stick-out portion 213c is a portion that is oblique relative to shaft portion 213b and extends from a portion between head portion 213a and the tip end of shaft portion 213b outwardly from shaft portion 213b and toward head portion 213a. Spacing is provided between head portion 213a and the tip end of stick-out portion 213c. Pin 213 is an example of a fifth moving member.

In the case of coupling modules 310 and 320 by using coupling module 210 configured as described above, as shown in (a) in FIG. 16, shaft portion 213b of pin 213 is inserted into through hole 211b of casing 211, and pin 213 is pushed in minus Z-axis direction. In response thereto, as shown in (b) in FIG. 16, the tip end of shaft portion 213b of pin 213 pushes inclined surface 212a of moving member 212 in minus Z-axis direction. Accordingly, moving member 212 moves toward plus X-axis direction, and leading end portion 212b of moving member 212 protrudes from through hole 201f of casing 211. As a result, as described in Embodiments 1 and 2, coupling module 200 is coupled to modules 310 and 320, and fixed to mounting surface 10a.

Next, in the case of detaching the passenger operation device from mounting surface 10a, as shown in (a) in FIG. 17, rod 21 is inserted into through hole 211c of casing 211 so as to push stick-out portion 213c of pin 213 toward shaft portion 213b. This allows stick-out portion 213c to pass through through hole 211b of casing 211. Accordingly, as shown in (b) in FIG. 17, by pulling out pin 213 in plus Z-axis direction, with stick-out portion 213c being pushed, pin 213 can be detached. Upon detachment of pin 213, moving member 212 moves toward minus X-axis direction because moving member 212 is biased toward minus X-axis direction by springs 314 and 324 of modules 310 and 320. The coupling of coupling module 210 with respect to modules 310 and 320 is disconnected, and thus the passenger operation device can be taken out from mounting surface 10a.

(D)

Figure 18:
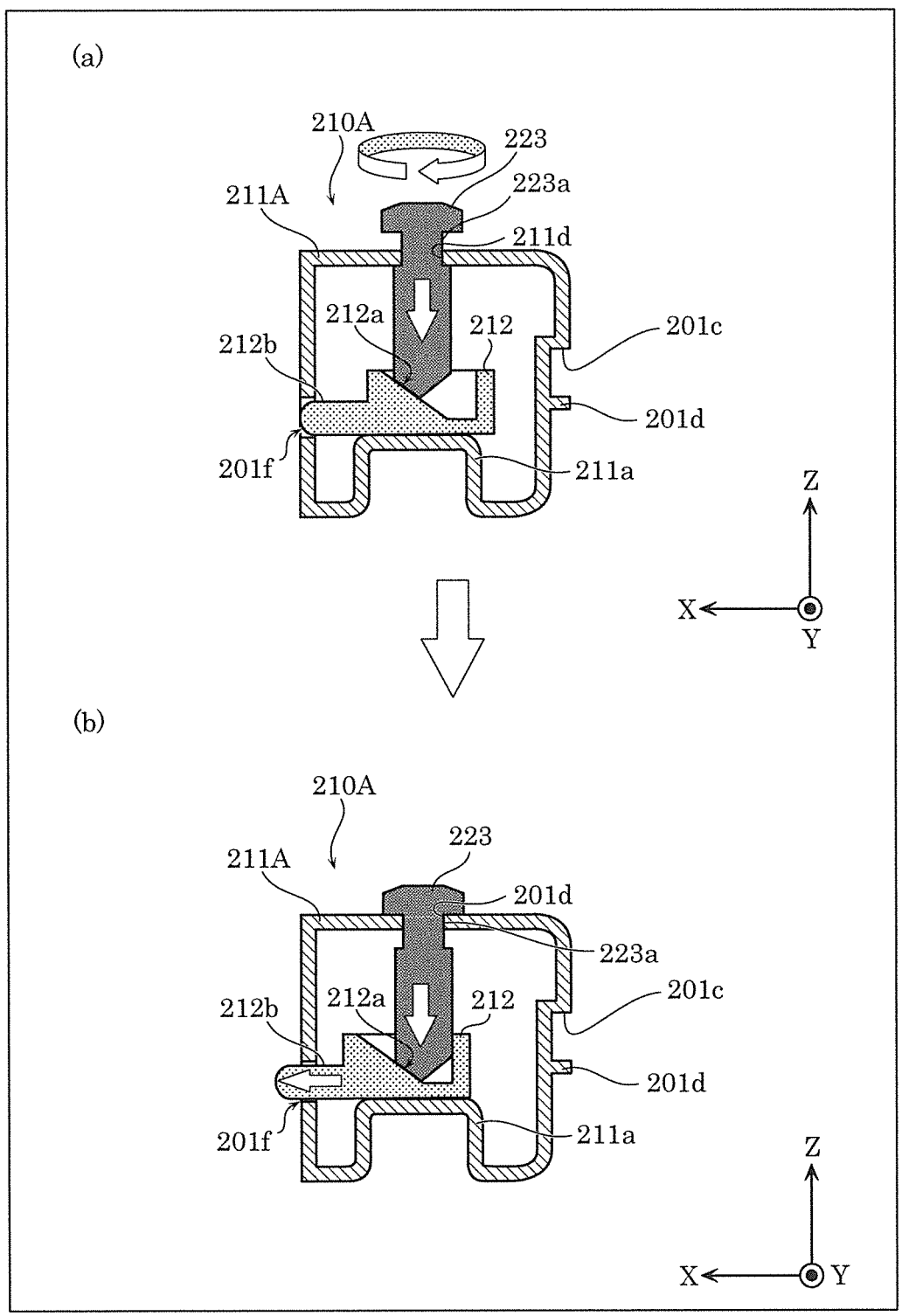
FIG. 18 is a diagram showing a configuration of a coupling module according to Additional Embodiment (D).

Additional Embodiment (C) described above is configured such that moving member 212 is moved in plus X-axis direction side by using pin 213, but instead of pin 213, as shown in FIG. 18, it is also possible to use screw 223 that moves toward a direction different from X-axis direction by being rotated, and pushes moving member 212 toward plus X-axis direction.

FIG. 18 is a diagram showing a configuration of coupling module 210A according to Additional Embodiment (D).

Coupling module 210A shown in FIG. 18 includes casing 211A, moving member 212, and screw 223.

Casing 211A is different from casing 211 shown in FIGS. 16 and 17 in that casing 211A does not have through hole 211c of casing 211, but has through hole 211d that has a shape different from that of through hole 211b of casing 211. Other than the above, casing 211A includes the same structural elements as those of casing 211, and the same reference numerals are given, and a description thereof is omitted. Through hole 211d has a shape that allows screw threaded engagement with male threaded portion 223a of screw 223.

In the case of coupling modules 310 and 320 by using coupling module 210A configured as described above, as shown in (a) in FIG. 18, screw 223 is rotated to move in minus Z-axis direction. The tip end of screw 223 thereby pushes inclined surface 212a of moving member 212 toward minus Z-axis direction as shown in (b) in FIG. 18. Accordingly, moving member 212 moves toward plus X-axis direction, and leading end portion 212b of moving member 212 protrudes from through hole 201f of casing 211. Thus, as described in Embodiments 1 and 2, coupling module 200 is coupled to modules 310 and 320, and fixed to mounting surface 10a.

In the case of detaching the passenger operation device from mounting surface 10a, screw 223 is rotated in the opposite direction to move toward plus Z-axis direction. As a result, in the same manner as described with reference to (b) in FIG. 17, the coupling of coupling module 210 with respect to modules 310 and 320 is disconnected, and thus the passenger operation device can be taken out from mounting surface 10a.

(E)

In Embodiments 1 and 2 given above, the first module is composed of, for example, two modules such as operation button module 310 and connector module 320 that are coupled to each other. However, the first module may be composed of only one first module, or three or more first modules may be coupled.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful as a module attachment device that has a compact configuration and facilitates an attachment operation for attachment to a mounting surface. To be specific, the present disclosure is applicable to a monitor apparatus that can perform opening and closing operations in response to collision in front and back direction of the monitor, and is applicable to a monitor apparatus installed in, for example, a moving vehicle such as an aircraft, a train, a bus, and the like.

What is claimed is:

1. A module attachment device, comprising:
   a first module that includes a first casing and a first moving member, the first moving member being configured such that when a first end is pushed, a second end protrudes from the first casing; and
   a second module that is engaged with a mounting surface, and includes a second moving member that is disposed at a position where the second moving member is capable of pushing the first end of the first moving member,
   wherein in response to the first end of the first moving member being pushed by the second moving member, the second end of the first moving member protruding from the first casing comes into engagement with the mounting surface, and
   when the second end of the first moving member is not engaged with the mounting surface, the first module is not coupled to the second module.

2. A module attachment device, comprising:
   a plurality of first modules, each including a first casing and a first moving member, the first moving member being configured such that when a first end is pushed, a second end protrudes from the first casing; and
   a second module that is engaged with a mounting surface, and includes a second moving member that is disposed at a position where the second moving member is capable of pushing the first end of the first moving member of one of the plurality of first modules,
   wherein in response to the first end of the first moving member of the one of the plurality of first modules being pushed by the second moving member, the second end of the first moving member of the one of the plurality of first modules protruding from the first casing pushes a first end of the first moving member of another one of the plurality of first modules to bring another one of the plurality of first modules into engagement with still another one of the plurality of first modules, or the mounting surface.

3. The module attachment device according to claim 2,
   wherein the plurality of first modules and the second module that is engaged with the mounting surface are aligned in a predetermined direction,
   when the second moving member is moved in the predetermined direction, the second moving member moves the first moving member of the one of the plurality of first modules that is adjacent to the second module in the predetermined direction, and causes the second end of the first moving member to protrude from the first casing of the one of the plurality of first modules, and the second end of the first moving member of a farthest one of the plurality of first modules that is farthest from the second moving member protrudes, in the predetermined direction, from the first casing of the farthest one of the plurality of first modules, and comes into engagement with the mounting surface.

4. The module attachment device according to claim 1, wherein the second module includes a second casing, and the module attachment device further comprises a fifth moving member that moves the second moving member in a protrusion direction to protrude from the second casing.

5. The module attachment device according to claim 4, wherein the fifth moving member causes the second moving member to protrude from the second casing by pushing the second moving member from a different direction that is different from the protrusion direction of the second moving member.

6. The module attachment device according to claim 2, wherein the first moving members of two adjacent ones of the plurality of first modules are disposed to oppose each other.

7. The module attachment device according to claim 1, wherein the second moving member is disposed to oppose the first moving member of the first module that is disposed adjacent to the second module.

8. The module attachment device according to claim 5, wherein the fifth moving member is rotated to move in the different direction and push the second moving member.

* * * * *